United States Patent [19]

Cheresnowsky et al.

[11] Patent Number: 4,469,505
[45] Date of Patent: Sep. 4, 1984

[54] METHOD FOR PRODUCING COBALT METAL POWDER

[75] Inventors: Michael J. Cheresnowsky; Clarence D. Vanderpool, both of Towanda, Pa.

[73] Assignee: GTE Products Corporation, Stamford, Conn.

[21] Appl. No.: 208,369

[22] Filed: Nov. 19, 1980

[51] Int. Cl.³ .............................................. B22F 9/00
[52] U.S. Cl. ........................... 75/0.5 BA; 75/0.5 AA; 75/119
[58] Field of Search ...... 75/0.58 R, 0.58 A, 0.58 AA, 75/0.58 B, 0.58 BA, 0.58 AB, 0.58 AC, 119; 423/140, 141, 143, 144, 145

[56] References Cited

U.S. PATENT DOCUMENTS 3,013,875 12/1961 Triffleman ...................... 75/0.5 AC
4,214,895 7/1980 Gingerich et al. ............. 75/0.5 AA Primary Examiner—Michael L. Lewis
Attorney, Agent, or Firm—Robert E. Walter

[57] ABSTRACT

In a process for producing fine cobalt metal powder by reduction of a cobalt hydroxide precipitate, the cobalt hydroxide precipitate is heat treated prior to reduction at a selected temperature for reducing the Fisher Sub Sieve Size of the finally produced cobalt metal powder.

9 Claims, 1 Drawing Figure

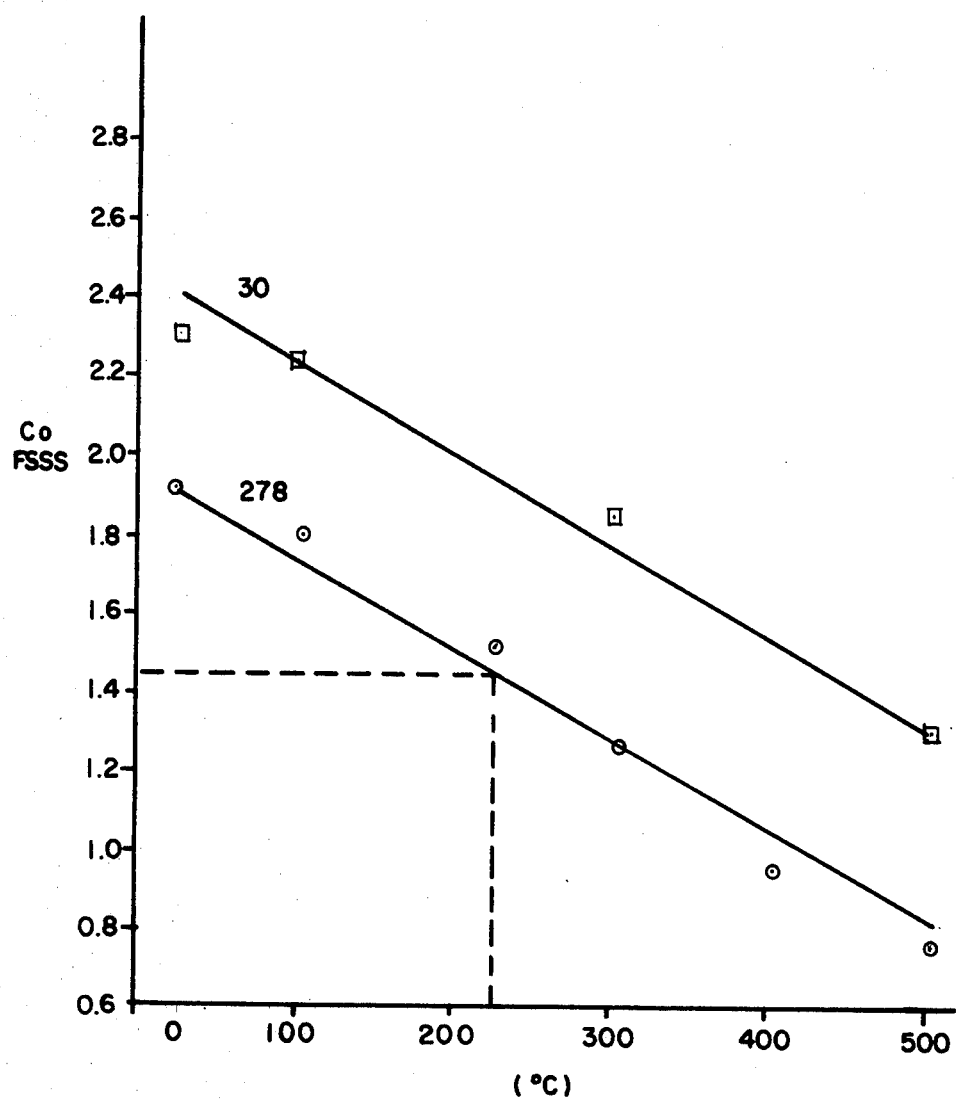

METHOD FOR PRODUCING COBALT METAL POWDER

CROSS REFERENCE TO RELATED APPLICATIONS

Co-pending applications relating to the production of fine metal cobalt include Ser. No. 038,973, now U.S. Pat. No. 4,214,896 relating to mother liquor treatment, Ser. No. 038,968, now U.S. Pat. No. 4,214,894 utilizing an ion exchange resin during cobalt liquor processing, Ser. No. 038,972, now U.S. Pat. No. 4,233,063 including an ammonia recycling step, Ser. No. 038,970, now U.S. Pat. No. 4,218,240 relating to producing cobaltic hexammine complex as an intermediate step, and Ser. No. 038,971, now U.S. Pat. No. 4,214,895 relating to the use of a metallic hydroxide to form a cobalt containing precipitate and U.S. Ser. No. 179,332 relating to the formation of a cobalt precipitate by heating an aqueous solution of soluble cobaltic ammine halide to form the cobalt precipitate.

TECHNICAL FIELD

This invention relates to the production of fine cobalt metal powder from an impure cobalt source, and more particularly relates to the process for obtaining such powder by the hydrogen reduction of a precipitate obtained from an aqueous solution containing cobalt.

Fine cobalt powder of high purity is typically used in the manufacture of cemented carbide cutting tools, magnetic tapes, and magnetic inks.

BACKGROUND OF THE INVENTION

According to German Pat. No. 2,319,703, it is known to separate cobalt from nickel by a process which includes forming pentammine sulfate complexes of the two ions in solution. However, it has been found that soluble cobalt ammine sulfates can only be reduced while still in solution, under pressure, and with the aid of catalysts. Furthermore, the resulting cobalt powder is not fine particle size.

U.S. Pat. No. 4,093,450 to Doyle et al. describes a process for producing fine particle size cobalt metal powder by the hydrogen reduction of cobalt oxide obtained from a cobalt pentammine carbonate solution. The precipitate was formed by heating the solution to drive off ammonia and carbon dioxide to form a precipitate of cobalt oxide. This process requires a solution of approximately four grams per liter of cobalt to produce a metal powder having a particle size less than one micron. Note that the final resulting particle size is less than one micron is highly dependent on the concentration of cobalt employed in the aqueous solution.

U.S. Pat. No. 4,184,868 to Ritsko et al relates to a process for producing metal powder cobalt by forming a cobalt pentammine chloride solution, digesting the solution to form a black precipitate, and reducing the precipitate to form cobalt metal powder.

The following patents are directed to the separation of cobalt from other cations, especially nickel. The resulting cobalt compounds are not disclosed as being sources for forming fine particle size cobalt.

U.S. Pat. No. 2,879,137 to Bare et al. discloses the treatment of an ammoniacal ammonium carbonate solution obtained from leaching an ore and containing nickel wherein the cobalt present in the cobaltic state is treated with an alkali metal or alkaline earth metal hydroxide under controlled temperature conditions to precipitate the nickel free of cobalt.

U.S. Pat. No. 3,928,530 to Bakker et al. discloses a process for the separation of nickel and cobalt by forming pentammine chloride complexes in solution containing a high concentration of ammonium chloride, and precipitating cobalt pentammine chloride.

In German Pat. No. 1,583,864, cobalt is recovered from scrap by digestion of the scrap in HCl and $MgCl_2$ solution, followed by removal of iron and chromium impurities by precipitation at a moderately acid pH followed by extracting a cobalt chloride complex with a long chain tertiary amine in an aromatic solvent.

U.S. Pat. No. 4,108,640 to Wallace discloses a process for recovering metallic cobalt from an aqueous ammoniacal solution wherein the solution is contacted with a water immiscible liquid ion exchange reagent dissolved in an inert organic diluent to selectively extract the other metal from the solution and produce an organic extract loaded with the other metals and an aqueous cobalt bearing raffinate substantially free of the other metals.

SUMMARY OF THE INVENTION

A problem encountered in the production of cobalt according to the method described in U.S. Pat. No. 4,184,868 discussed above and other cobalt process is the production of hard tailings after reduction. Such tailings are larger particles than the desired fine powder and must be reprocessed. It is an object of the present invention to reduce the amount of tailings formed and hence increase the yield of fine metallic cobalt particles.

The process of the present invention can be used to effectively form fine cobalt powder with controlled Fisher Sub Sieve Size independent of the particle size of the cobalt containing precipitate.

Other and further objects of the present invention will become apparent from the following description.

In accordance with the present invention, there is provided a process for producing fine cobalt metal powder from a cobalt hydroxide precipitate of the type which yields a cobalt metal powder when reduced having a greater Fisher Sub Sieve Size than desired, said process comprising heat treating said cobaltic hydroxide for a sufficient period of time at a selected temperature whereby cobalt metal powder of the desired size is produced after reduction, said selected temperature varying inversely with a decreasing desired Fisher Sub Sieve Size within a range of from 110° C. to about 600° C.

DRAWINGS

FIG. 1 is a presentation of data.

DETAILED DESCRIPTION

Fine particle size cobalt, typically having a Fisher Sub Sieve Size (FSSS) from about 0.5 to about 3.0, is produced directly by the reduction of a cobalt containing precipitate which is formed by heating an aqueous solution of a soluble cobaltic ammine halide. The cobalt containing precipitate may be formed from solutions having a wide range of cobaltic ammine halide concentration. Preferably the solution contains cobaltic ammine halide from about 5 grams per liter based on the weight of cobalt up to the limits of solubility of the cobaltic ammine halide. Cobaltic ammine halide is more preferably present in solution in an amount from about 5 grams to about 60 grams and more preferably from about 10 grams to about 50 grams based on the cobalt present in solution.

It is contemplated that the solution containing the soluble cobaltic ammine halide may be derived from a variety of sources. The purity of the resulting metallic cobalt is dependent on the purity of the starting solution in that certain metallic cations which may be regarded as impurities may precipitate with the cobalt and may be present in the final reduced cobalt metallic powder. The solution preferably consists essentially of aqueous cobaltic ammine halide and an acceptable amount of impurities.

It is generally preferred that the cation impurities be present in the solution in an amount less than about 2 percent by weight based on the amount of cobalt present in the solution. Typical cation impurities include iron, manganese, copper, aluminum, chromium, magnesium, calcium, etc. For the preparation of cobalt powders to be used in the cemented carbide industry, it is preferable that the cation impurity of the solution be less than about 0.2 percent by weight based on the cobalt present in solution.

Typical solutions containing cobalt which may be utilized in the present invention may be derived from sludges and leach solutions from cemented carbide or tungsten recovery operations. For those solutions containing the cobaltous ion, oxidation to the cobaltic ion is preferable to result in improved recovery.

According to one process, a cobalt source containing various impurities is digested in hydrochloric acid solution to obtain a solution of about 60 to 150 grams per liter of cobalt in a 1 to 6 molar hydrochloric acid solution. Ammonium hydroxide is added to result in a concentration of about 100 to 150 grams per liter of ammonium chloride at a pH of about 9.0 to 10.0. Air oxidation of the cobaltous ion to cobaltic results in the formation of cobaltic ammine ions. At least a portion of the cobaltic ammine ions are preferably present in the form of cobaltic hexammine and halocobaltic pentammine having the formula $Co(NH_3)_6^{+++}$ and $Co(NH_3)_5X^{++}$ wherein X is a halogen or hydroxide.

It is preferable to reduce the cation impurities by further purification of the solution. According to one such method, a solution which has been formed by the digestion of the cobalt source in hydrochloric acid according to the above method and containing cobalt ammine ions may be treated with a sufficient amount of hydrochloric acid to reduce the pH to less than about 1.0 to precipitate chloropentamminecobalt(III) dichloride and hexamminecobalt(III) trichloride. Filtration of the solution results in the precipitated cobalt ammine halides being separated from the acid solution containing soluble cation impurities.

The crude cobaltic ammine halide precipitate may be further purified by subsequent crystallizations wherein the cobaltic ammine halide precipitate is first dissolved in ammonium hydroxide solution, next, acidified to produce a cobaltic ammine precipitate, and then is separated from the liquor containing impurities. The cobaltic ammine halide precipitate is redissolved to form a solution of increased purity.

Next, a cobalt containing precipitate is produced from the solution of cobaltic ammine halide. According to U.S. Pat. No. 4,184,868, the cobaltic amine halide solution is digested for about 2 to about 10 hours at a temperature of from about 80° to about 100° C. to form a wet cobalt oxide hydrate precipitate which is separated from the solution and subsequently reduced. According to U.S. Ser. No. 038,971 the wet cobalt containing precipitate is produced from an aqueous cobaltic ammine halide solution by treating the solution with an alkali metal hydroxide. According to U.S. Ser. No. 179,332 an aqueous solution of soluble cobaltic ammine halide is digested by heating to a temperature of at least about 120 degrees centigrade to decompose the cobaltic ammine halide to form the wet cobalt containing precipitate. U.S. Ser. No. 038,970 describes the production of cobaltic hexammine chloride solution prior to treatment with an alkali metal hydroxide to form the cobalt containing precipitate.

The wet cobalt containing precipitate is believed to be an amorphous hydrated cobaltic compound referred to as a cobaltic hydroxide precipitate. The precipitate preferably has a black coloration and may have a nonuniform consistency.

The cobalt containing precipitate may be separated from the aqueous solution and heated in a reducing atmosphere for a time and temperature sufficient to reduce the wet cobalt containing precipitate to cobalt metal powder. Such a reduction is usually carried out in a hydrogen atmosphere for a period of time of about 1 to about 6 hours at a temperature of from about 300° C. to about 600° C.

The resulting powder is separated into portions by screening. The portion remaining on the screening surface which is oversized is called tailings and is unsuited for use as fine cobalt powder. Any process which reduces the amount of tailings or enhances the control of cobalt powder size may be beneficial since the yield of cobalt powder of a particular size may be obtained.

Cobalt powder is obtained by chemical reduction of cobaltic hydroxide or cobalt oxide hydrate by hydrogen at elevated temperatures. Cobalt powder thus obtained may be screened to obtain cobalt powder of a predetermined size. Preferably the screen size is 100 mesh since −100 mesh cobalt makes a good powder for cemented carbides if Fisher Sub Sieve Size is 1.50 or less.

The Fisher Sub Sieve Size is a unitless measurement of particle size which has gained industrial acceptance. The Sub Sieve apparatus is available commercially from Fisher Scientific Co. for taking advantage of the airpermeability method. The method is based on the relation between specific surface of packed particles and their permeability [Caeman, J. Soc. Chem Inc. (London), 57,225 (1938)]. The air permeability method relates to average particle size and does not give particle size distribution.

Cobalt obtained from cobaltic hydroxide derived from monochloropentamminecobalt(III) dichloride is frequently in excess of 1.50 FSSS. Cobalt obtained from cobaltic hydroxide derived from hexamminecobalt(III) trichloride may sometimes be in excess of 1.50 FSSS. Through the use of this invention, cobalt with FSSS less than 1.50 can be obtained from cobaltic hydroxide lots that give FSSS greater than 1.50 when processed routinely according to prior art.

In accordance with the principles of the present invention cobaltic hydroxide is heat-treated prior to reduction to yield a resulting cobalt having FSSS lower than if it had not been heat-treated. The drop in cobalt FSSS varies with the temperature of the heat-treatment, and, consequently, it is possible to obtain a desired cobalt FSSS by selecting the appropriate temperature for the heat-treatment.

These relationships are observed in Table I and Table II and are plotted in FIG. 1. The data in Table I represent work with cobaltic hydroxide derived from pentammine while the data in Table II represent work with cobaltic hydroxide derived from hexammine. In both cases the cobaltic hydroxide was first heated at 100° C. for 16 hours and then passed through a 100-mesh screen. Heat-treatment at the other specified temperatures then occurred for 16 hours and was followed by passing through a 100-mesh screen. Reduction was carried out for 4 hours at 400° C. and 10 SCFH of hydrogen. Following reduction the cobalt was screened by machine for 30 minutes over a 100-mesh screen. The −100 mesh portion was submitted for FSSS. The −100 mesh portion was also submitted for BET measurement. The +100 mesh portion, or tailings, was weighed so as to determine percentage tailings and characterized as to hardness.

Note in Table I and FIG. 1 the test identified as 27-225 (i.e., heat-treatment temperature of 225° C.). This particular test was a confirmation of the utility of the invention in that all other data points had been obtained and plotted and in that it was determined from the graph (see dotted lines in FIG. 1) that heat-treatment at 225° C. would be required to obtain a cobalt FSSS of approximately 1.45. The FSSS actually obtained was 1.53, which is acceptable within experimental and measurement accuracies.

The method described above is one manner in which the invention works in practice. Samples of a cobaltic hydroxide lot may be heat-treated at several temperatures over the range of 100°–600° C. These heat-treated samples and an as-received sample are reduced and screened, and the −100 mesh portions are measured for FSSS. The FSSS of each sample is plotted against its heat-treatment temperature and the line drawn. The plot may then be used to determine what heat-treatment temperature is required for the cobalt FSSS desired. (See dotted lines in FIG. 1.)

Preferably the finally produced cobalt metal powder has a FSSS of 1.5 or less. By the process of the present invention, cobalt hydroxide which produces cobaltic metal powder greater than 1.5 FSSS may be produced. Preferably the cobaltic hydroxide which produces cobalt metal powder out of specification is such that the cobalt metal powder produced is less than about 3.0 FSSS.

An alternate method exists when the slopes of all cobaltic hydroxide lots are very similar. The required heat-treatment temperature is determined on the basis of the slope and upon FSSS of cobalt obtained from as-received cobaltic hydroxide.

The selected temperature varies inversely with a decreasing desired Fisher Sub Sieve Size according to the following formula: Desired decrease in FSSS times a Constant (K) approximately equals the selected temperature in degrees centigrade. The desired decrease in FSSS equals the FSSS of the cobalt metal powder having a greater FSSS than desired minus the desired FSSS.

For example, from FIG. 1 the slope is determined as −0.2 FSSS/100° C. The FSSS of cobalt obtained from as-received 27 was 1.91. If a FSSS of 1.45 is desired, the change in FSSS would be 0.46. (1.91 − 1.45 = 0.46) Since FSSS decreases 0.2 FSSS/100° C., the required heat-treatment temperature would be calculated to be 230° C.

$$\Delta FSSS \times K = \text{Temp. °C.}$$

$$0.46\ FSSS \times \frac{100° C.}{0.2\ FSSS} = 230° C.$$

Agreement with the graphical method is good.

The process of the present invention may be used on cobaltic hydroxide that previously produced unsuitable cobalt for producing cobalt that has in-spec FSSS. The constant (K) is preferably from about 400 to about 650, more preferably from about 450 to about 550 and the desired decrease in FSSS is preferably 0.2 or greater. The selected temperature is more preferably from about 200° C. to about 550° C.

The relationship between temperature of heat-treatment and tailings is seen in Table I and II. As temperature of heat-treatment increases, the percentage of tailings decreases and tailings become softer. Preferably at least 98% of the cobalt passes through a 100 mesh screen after treatment according to the process of present invention. Softer tailings are advantageous because they would eventually all pass through the screen in a continuous screening operation.

There are limits on the range of heat-treatment temperatures since continued increase in heat-treatment temperature does not bring continually lower cobalt FSSS. A minimum is reached at heat-treatment temperatures of around 600° C. At higher temperatures, FSSS begins to increase again. See Table II.

As temperature of heat-treatment is increased, cobalt porosity increases and cobalt BET area increases. These changes are reflected in changes in cobalt morphology, as determined by SEM photomicrographs. As temperature of heat-treatment is increased, cobaltic oxide FSSS increases, cobaltic oxide porosity decreases, cobaltic oxide BET area decreases, and cobaltic hydroxide converts to cobaltocobaltic oxide ($Co_3O_4$) and becomes increasingly more crystalline.

TABLE I

| Heat Treating Cobaltic Hydroxide to Control Co FSSS | | | | |
|---|---|---|---|---|
| Sample | Heat Treatment | Cobalt FSSS | % Tailings | Hardness |
| 27 | None | 1.91 | 62.0 | Medium to hard |
| 27-100 | 100° C.-16 hrs | 1.80 | 18.5 | Soft to medium |
| 27-225 | 100° C.-16 hrs and 225° C.-16 hrs | 1.53 | 6.7 | Soft |
| 27-300 | 100° C.-16 hrs and 300° C.-16 hrs | 1.27 | 0.6 | Soft |
| 27-400 | 100° C.-16 hrs and 400° C.-16 hrs | 0.95 | 0.5 | Very soft |
| 27-500 | 100° C.-16 hrs and 500° C.-16 hrs | 0.78 | 7.5 | Very Soft |

TABLE II

| Heat Treating Cobaltic Hydroxide to Control Co FSSS | | | | |
|---|---|---|---|---|
| Sample | Heat Treatment | Cobalt FSSS | % Tailings | Hardness |
| 30 | None | 2.32 | 5.1 | Soft |
| 30-100 | 100° C.-16 hrs | 2.22 | 16.6 | Soft |

TABLE II-continued

Heat Treating Cobaltic Hydroxide to Control Co FSSS

| Sample | Heat Treatment | Cobalt FSSS | % Tailings | Hardness |
|---|---|---|---|---|
| 30-300 | 100° C.-16 hrs and 300° C.-16 hrs | 1.85 | 0.0 | — |
| 30-500 | 100° C.-16 hrs and 500° C.-16 hrs | 1.29 | 0.0 | — |
| 30-600 | 100° C.-16 hrs and 600° C.-16 hrs | 1.18 | 0.2 | Very soft |
| 30-700 | 100° C.-16 hrs and 700° C.-16 hrs | 1.29 | 0.5 | Very soft |

While preferred embodiments of this invention have been described and illustrated, it is to be recognized that modifications and variations thereof may be made without departing from the spirit and scope of this invention as described in the appended claims.

INDUSTRIAL APPLICABILITY

The method described and claimed herein is particularly useful in the formation of extra fine particle size cobalt powders of high purity, which is useful, for example, as a starting material in the formation of cemented carbides, e.g . . . , tungsten carbide.

We claim:

1. A process for producing a fine cobalt metal powder from a cobaltic hydroxide precipitate of the type which yields a cobalt metal powder when reduced having a greater Fisher Sub Sieve Size than desired, said process comprising heat treating said cobaltic hydroxide for a sufficient period of time at a selected temperature, said selected temperature varying inversely with a decreasing desired Fisher Sub Sieve Size within a range of from 200° C. to about 550° C.

2. A process for producing a fine cobalt metal powder according to claim 1 wherein said cobaltic hydroxide precipitate is formed from an aqueous cobaltic ammine chloride solution.

3. A process for producing a fine cobalt metal powder according to claim 2 wherein said aqueous solution consists essentially of cobaltic ammine chloride present in solution from about 5 grams per liter based on cobalt present in solution up to the limits of solubility of cobaltic ammine halide, water, and less than 2 percent by weight impurities based on cobalt present in solution.

4. A process for producing a fine cobalt metal powder according to claim 3 wherein said cobaltic hydroxide precipitate is the type which yields a cobalt metal powder when reduced having a Fisher Sub Sieve Size greater than about 1.50.

5. A process for producing a fine cobalt metal powder according to claim 1 wherein the selected temperature is a function of the desired decrease in Fisher Sub Sieve Size according to the following formula: Desired decrease in Fisher Sub Sieve Size times a constant approximately equals the selected temperature in degrees Centigrade.

6. A process for producing a fine cobalt metal powder according to claim 5 wherein said desired decrease in Fisher Sub Sieve Size equals the Fisher Sub Sieve Size of the cobalt metal powder having a greater Fisher Sub Sieve Size than desired minus the desired Fisher Sub Sieve Size, said desired decrease in Fisher Sub Sieve Size being 0.2 or greater and said constant being from about 400 to about 650.

7. A process for producing a fine cobalt metal powder according to claim 6 wherein said desired Fisher Sub Sieve Size is about 1.5 or less.

8. A process for producing a fine cobalt metal powder according to claim 7 wherein after reducing said resulting cobalt metal powder is screened through about a 100 mesh screen.

9. A process according to claim 8 wherein more than 98 percent of the resulting cobalt metal powder passes through said screen.

* * * * *